US010896498B2

(12) United States Patent
Szarski (10) Patent No.: US 10,896,498 B2
(45) Date of Patent: Jan. 19, 2021

(54) CHARACTERIZATION OF MELTED VEIL STRAND RATIOS IN PLIES OF FIBER MATERIAL

(71) Applicant: The Boeing Company, Chicago, IL (US)

(72) Inventor: Martin Alexander Szarski, Brighton East (AU)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 16/042,040

(22) Filed: Jul. 23, 2018

(65) Prior Publication Data

US 2020/0027206 A1    Jan. 23, 2020

(51) Int. Cl.
| *G06T 7/00* | (2017.01) |
| *G06N 3/08* | (2006.01) |
| *G06T 7/90* | (2017.01) |

(52) U.S. Cl.
CPC ............ *G06T 7/0004* (2013.01); *G06N 3/08* (2013.01); *G06T 7/90* (2017.01); *G06T 2207/20021* (2013.01); *G06T 2207/30164* (2013.01); *G06T 2207/30242* (2013.01)

(58) Field of Classification Search
CPC ...... G06T 7/0004; G06T 7/90; G06T 2207/30242; G06T 2207/30164; G06T 2207/20021; G06N 3/08; G01N 21/251; G01N 21/8851; G01N 2201/1296; G01N 2021/8472; G01N 2021/1776; G01N 2021/8887; B29C 70/54
See application file for complete search history.

(56) References Cited

U.S. PATENT DOCUMENTS

| 5,699,799 A | 12/1997 | Xu et al. |
| 8,548,215 B2 | 10/2013 | Westerhoff et al. |
| 2008/0075383 A1* | 3/2008 | Wu ............................ G06T 7/41 |
| | | 382/274 |
| 2014/0374018 A1* | 12/2014 | Creaser ....................... C08J 5/04 |
| | | 156/286 |
| 2016/0102973 A1* | 4/2016 | Gonze .................. G01B 11/272 |
| | | 356/138 |
| 2018/0122060 A1* | 5/2018 | Shirkhodaie .......... G06T 7/0008 |
| 2019/0308345 A1* | 10/2019 | Matsumoto ............ D02G 3/402 |

FOREIGN PATENT DOCUMENTS

| EP | 0664446 A2 | 7/1995 |
| EP | 2896496 A1 | 7/2015 |
| RU | 2231054 C1 | 6/2004 |

OTHER PUBLICATIONS

European Search Report; Application EP95300242; dated Jun. 22, 1995.
Shaoqing Ren et al., Faster R-CNN: Towards Real-Time Object Detection with Region Proposal Networks; Jan. 6, 2016.
European Search Report; Application No. EP19170135; dated Nov. 15, 2019.

* cited by examiner

*Primary Examiner* — Minjung Kim
(74) *Attorney, Agent, or Firm* — Duft & Bornsen, PC (57) ABSTRACT

Systems and methods are provided for characterizing a ply of fiber having a thermoplastic veil. One method includes acquiring an image of a fiber material comprising strands of fiber and further comprising a veil of filaments of thermoplastic, subdividing the image into slices, determining an amount of melted filaments depicted within each of the slices, and determining an amount of unmelted filaments depicted within each of the slices.

20 Claims, 8 Drawing Sheets

CHARACTERIZATION OF MELTED VEIL STRAND RATIOS IN PLIES OF FIBER MATERIAL

FIELD

The disclosure relates to the field of composite material, and in particular, to fiber reinforced composites that include a thermoplastic veil.

BACKGROUND

Dry carbon fiber material typically includes a thermoplastic veil (comprising multiple filaments) melted onto strands of carbon fiber. The strands of carbon fiber provide reinforcement of the material for stability and toughness, while the veil of thermoplastic binds the strands together. Dry carbon fiber material is used as an input for the fabrication of composite parts. In order to ensure consistent fabrication quality, it is desirable for the thermoplastic veil of dry carbon fiber material to have a specific amount of melting into the strands of carbon fiber. However, inspection of dry carbon fiber material remains a manual and labor intensive process, which in turn increases the cost of fabricating composite parts. This is particularly notable because thousands of feet of dry carbon fiber material may be utilized in a single composite part (e.g., the skin of a wing of an aircraft).

Therefore, it would be desirable to have a method and apparatus that take into account at least some of the issues discussed above, as well as other possible issues.

SUMMARY

Embodiments described herein utilize feature detection processes to characterize an amount of melting of a thermoplastic veil within a fiber material (e.g., a unidirectional dry carbon fiber material which has not been impregnated with a thermoset or thermoplastic resin, a fiberglass material, a material having metallic or even ceramic fibers, etc.). The amount of melting may be characterized by comparing a number of filaments of the veil that have melted (resulting in a color/brightness change) to a number of filaments of the veil that have not melted. For example, machine learning processes discussed herein may divide an image of a fiber material into slices, utilize a trained convolutional neural network to detect melted and unmelted filaments within a veil, and determine a ratio of melted to unmelted filaments for each slice. An overall metric of amount of melting may then be determined for an image, based on the ratio determined for each slice.

One embodiment is a method for characterizing a ply of fiber having a thermoplastic veil. The method includes acquiring an image of a fiber material comprising strands of fiber and further comprising a veil of filaments of thermoplastic, subdividing the image into slices, determining an amount of melted filaments depicted within each of the slices, and determining an amount of unmelted filaments depicted within each of the slices.

A further embodiment is a non-transitory computer readable medium embodying programmed instructions which, when executed by a processor, are operable for performing a method for characterizing a ply of fiber having a thermoplastic veil. The method includes acquiring an image of a fiber material comprising strands of carbon fiber and further comprising a veil of filaments of thermoplastic, subdividing the image into slices, determining an amount of melted filaments depicted within each of the slices, and determining an amount of unmelted filaments depicted within each of the slices.

A further embodiment is an apparatus for characterizing a ply of fiber having a thermoplastic veil. The apparatus includes an interface that receives an image of a fiber material comprising strands of fiber and further comprising a veil of filaments of thermoplastic, and a controller that subdivides the image into slices, determines an amount of melted filaments depicted within each of the slices, and determines an amount of unmelted filaments depicted within each of the slices.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together form a laminate. Individual fibers within each layer of the laminate are aligned parallel with each other, but different layers may exhibit different fiber orientations in order to increase the strength of the resulting composite along different dimensions. The laminate may include a viscous resin that solidifies in order to harden the laminate into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may arrive at a viscous form if it is re-heated. Systems and methods discussed herein describe the evaluation of dry fiber materials that include a binder in the form of a thermoplastic veil.

Figure 1:
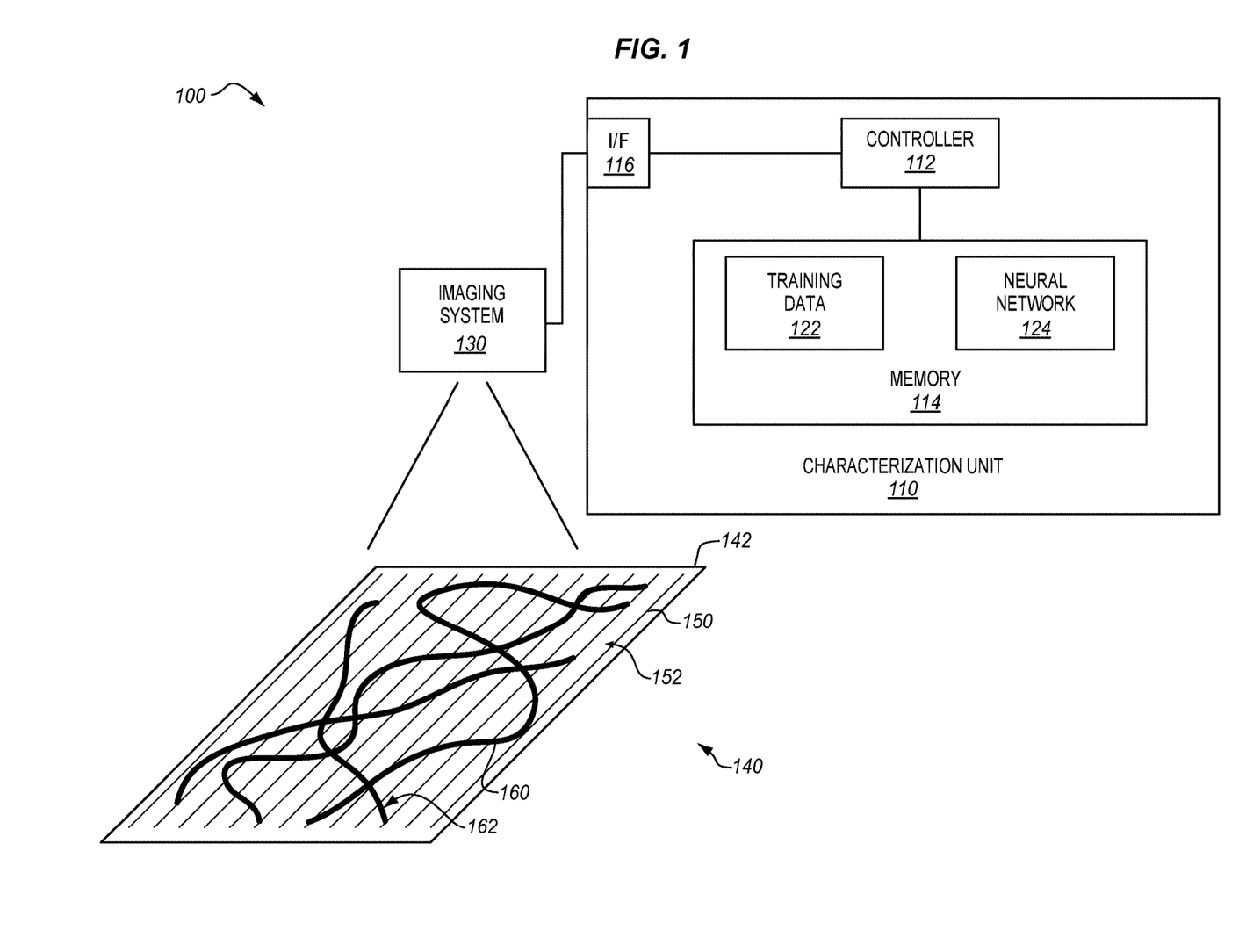
FIG. 1 is a block diagram of a fiber evaluation system in an illustrative embodiment.

FIG. 1 is a block diagram of a fiber evaluation system 100 in an illustrative embodiment. Fiber evaluation system 100 comprises any system, device, or component operable to automatically evaluate images of a fiber material (e.g., unidirectional CFRP, a fiberglass material, a material having metallic or even ceramic fibers, etc.) in order to determine a proportion of melted to unmelted thermoplastic filaments at the material. In this embodiment, fiber evaluation system 100 includes characterization unit 110 and imaging system 130.

Imaging system 130 acquires images of a sheet 140 of fiber material 142 (e.g., a ply of unidirectional CFRP, a fiberglass material, a material having metallic or even ceramic fibers, etc.)). These images may be acquired at a variety of locations along sheet 140, and/or at a variety of orientations. The images depict not just the strands 150 of fiber 152 (e.g., carbon fiber, glass fiber, metallic fiber, ceramic fiber, etc.) within sheet 140, but also depict a veil 160 of thermoplastic filaments 162 that act as a binder or tackifier for the strands 150. Each thermoplastic filament 162 may, for example, be seven thousandths of an inch thick, or even thinner. Each strand 150 may be even smaller, such that twelve- to forty-thousand strands are found within a single linear inch. Imaging system 130 may comprise a camera (e.g., a color camera, stereo camera, etc.), or other non-destructive imaging component, such as an ultrasonic or laser imaging device.

Images acquired via imaging system 130 are received at interface (I/F) 116. These images may be stored by controller 112 in memory 114 (e.g., a hard disk, flash memory, etc.) for later analysis. Controller 112 manages the operations of characterization unit 110 to facilitate image receipt, analysis, and reporting. For example, controller 112 may access the neural network 124 at memory 114 when evaluating images. Neural network 124 may comprise, for example, a convolutional neural network that has been trained based on training data 122 in order to detect unmelted filaments and melted filaments within an image.

Training data 122 may comprise a set of images or slices (e.g., thousands of such pictures), and accompanying tags indicating features found within these elements. For example, training data 122 may include images having regions that have already been labeled as melted or unmelted. Training data 122 may also include pictures taken of dry carbon materials wherein the in-plane fiber angle varies (e.g., zero degrees, plus forty-five degrees, minus forty-five degrees, ninety degrees, etc.). This may be relevant in order to train neural network 124 to account for differences in brightness or contrast found at these different fiber angles. Training data 122 may therefore be used to test and refine the processes by which neural network 124 detects both melted filaments and unmelted filaments. Controller 112 may be implemented, for example, as custom circuitry, as a hardware processor executing programmed instructions, or some combination thereof.

Illustrative details of the operation of fiber evaluation system 100 will be discussed with regard to FIG. 2. Assume, for this embodiment, that a technician wishes to characterize sheet 140 of fiber material 142, in order to determine whether the ratio of melted filaments to unmelted filaments within sheet 140 is within a desired tolerance.

Figure 2:
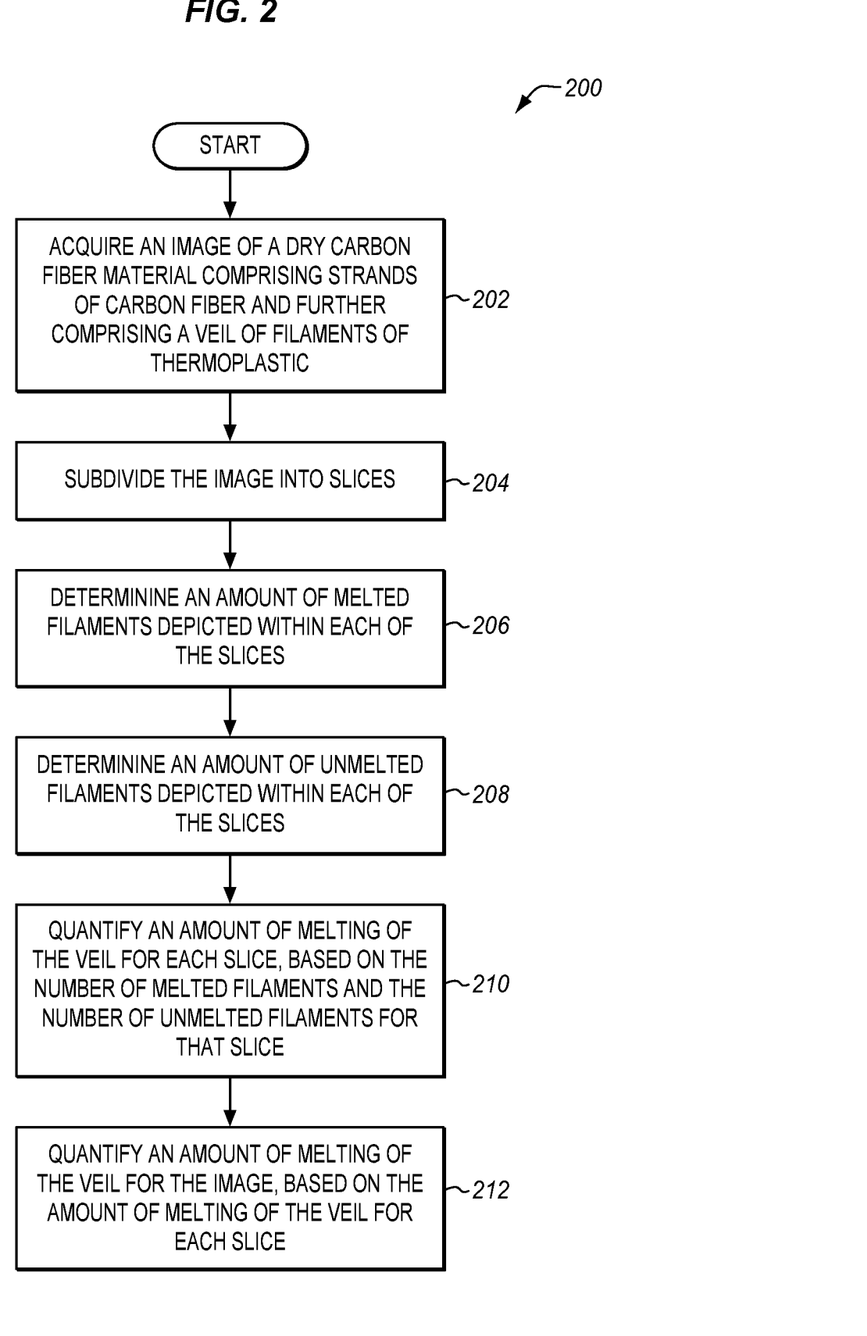
FIG. 2 is a flowchart illustrating a method for evaluating fiber material in an illustrative embodiment.

FIG. 2 is a flowchart illustrating a method 200 for evaluating fiber material in an illustrative embodiment. The steps of method 200 are described with reference to fiber evaluation system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, imaging system 130 acquires an image of a sheet 140 of fiber material 142. The fiber material 142 includes strands 150 of fiber 152, and also includes veil 160 of thermoplastic filaments 162 of thermoplastic. The image may be generated in any suitable format, and a digital version of the image may be acquired by I/F 116 for storage in memory 114. In one embodiment, an image is acquired every few hundred meters of length of the fiber material 142, and the image represents a small portion (e.g., a two inch by two inch portion) of the fiber material 142. However, the image may depict any suitable area of any suitable size desired.

Having acquired the image, controller 112 proceeds to subdivide the image into slices (step 204). As used herein, a "slice" may comprise any suitable portion of an image. For example, a slice may comprise a portion occupying an entire width of the image but only a fraction of a height of the image, may comprise a portion occupying an entire height of the image but only a fraction of a width of the image, may comprise a rectangular section, etc. Ideally, the size (e.g., narrow dimension) of a slice will be small enough so that multiple filaments are not depicted, yet large enough that a convolutional neural network trained for region detection may operate effectively when attempting to classify portions of the slice as representing melted filaments or unmelted filaments. For example, the slice size may be between sixty and one hundred and sixty pixels (e.g., one hundred pixels). Each slice may be expected to depict a number of distinct filaments, such as fifty to one hundred filaments.

In further embodiments, a slice size may be chosen such that the image height is evenly divisible by the slice size, or the image may be preprocessed (e.g., cropped, scaled, filtered, etc.) in order to enhance image quality and/or slicing.

In step 206, for each slice, controller 112 determines an amount of melted filaments depicted. As used herein, an "melted filament" (e.g., as depicted by melted portions 324 of FIG. 3) comprises a filament that has been melted into the strands 150. This may be performed by controller 112 operating the neural network 124 to detect features within the slice that are indicative of the presence of a melted filament. For example, melted filaments may be associated with a specific curvature, brightness, color, etc., and neural network 124 may have been trained via training data 122 to recognize such features. In one embodiment, neural network 124 performs feature analysis on a slice in order to detect the presence of one or more features associated with melted filaments. The size of each region considered by neural network 124 may be equal in dimension to a size of a slice being considered. If enough features are detected with enough confidence, then neural network 124 may indicate that a melted filament exists within the region of the slice being analyzed.

Furthermore, for each slice, controller 112 determines an amount of unmelted filaments depicted (i.e., step 208). As used herein, an "unmelted filament" (e.g., as depicted by unmelted portions 326 of FIG. 3) comprises a filament that rests atop the strands 150 without having been melted into the strands 150. This may be performed by controller 112 operating the neural network 124 to detect features within the slice that are indicative of the presence of an unmelted filament. For example, unmelted filaments may be associated with a specific curvature, brightness, color, etc., and neural network 124 may have been trained via training data 122 to recognize such features. When performing the determination with respect to unmelted filaments, neural network 124 may perform similar feature recognition tasks to those discussed above for step 206.

Certain portions of filaments may appear to be partially melted, in which case the controller 112 may classify the filaments into either the melted or unmelted state depending on how a neural network used by controller 112 has been trained. In further embodiments, certain regions may depict both melted filaments and unmelted filaments, and controller 112 may classify such a region as either melted or unmelted based on how a neural network used by controller 112 has been trained.

In step 206 and step 208, not all regions within a slice will necessarily include filaments (e.g., melted filaments or unmelted filaments). These regions may be reported as empty regions. The size of empty regions may be relevant when determining whether sheet 140 is within tolerances that are not related to melt ratio.

The amounts determined in step 206 and step 208 may indicate the size of regions (e.g., linear or planar regions) in which filaments of a given type were determined to exist, may indicate a number of filaments of a given type, or may comprise other suitable metrics (e.g., a number of pixels which are depicting filaments of a given type). These amounts are used to determine a ratio of melted filaments to unmelted filaments.

In step 210, controller 112 quantifies an amount of melting of the thermoplastic filaments 162 of the veil 160 for each slice. This may be performed, for example, by summing the amounts of melted filaments and unmelted filaments for a slice, and then dividing the amount of melted filaments by the sum. In further embodiments, this may comprise determining a ratio of melted filaments to unmelted filaments. Melt percentages desired by design specifications may vary depending on the application, but one example of a melt percentage is between thirty and fifty percent.

Step 212 comprises controller 112 quantifying an amount of melting of the veil 160 for the image, based on the amount of melting of the veil 160 for each slice. For example, controller 112 may average the amounts of melting determined in step 210 for each slice, in order to determine an amount of melting found within the image as a whole.

In further embodiments the method 200 may be repeated for the same image, by slicing the image differently (e.g., into "wide" slices, followed by "tall" slices, slices of different sizes, mirrored or rotated slices, slices having adjusted color or brightness or contrast, etc.). In still further embodiments, method 200 may be repeated for multiple images in order to quantify the entirety of sheet 140. For example, in embodiments where an entire roll comprising hundreds of feet of the dry carbon fiber material 142 is characterized, it may be desirable to acquire and analyze a large number of images of the material.

Method 200 provides a benefit over prior techniques and systems because it enables manual inspection techniques to be replaced with automated processes which are both less expensive and more accurate. This means that technicians are provided with more time to focus on other aspects of fabrication, which enhances the process by which composite parts are fabricated from dry carbon fiber materials.

The techniques of method 200 may be utilized to inspect the surfaces of a large number of plies in order to confirm a desired melt ratio at each of those plies before layup occurs. With the melt ratio known for each ply, any resulting preform created from the plies will also have a known melt ratio. This is true even for plies which are placed on the interior of that preform after they have been inspected.

EXAMPLES

In the following examples, additional processes, systems, and methods are described in the context of characterizing dry carbon fiber materials. That is, with a discussion of systems and methods for analyzing dry carbon fiber materials provided above, the following figures provide an example indicating how an image may be sliced and characterized.

Figure 3:
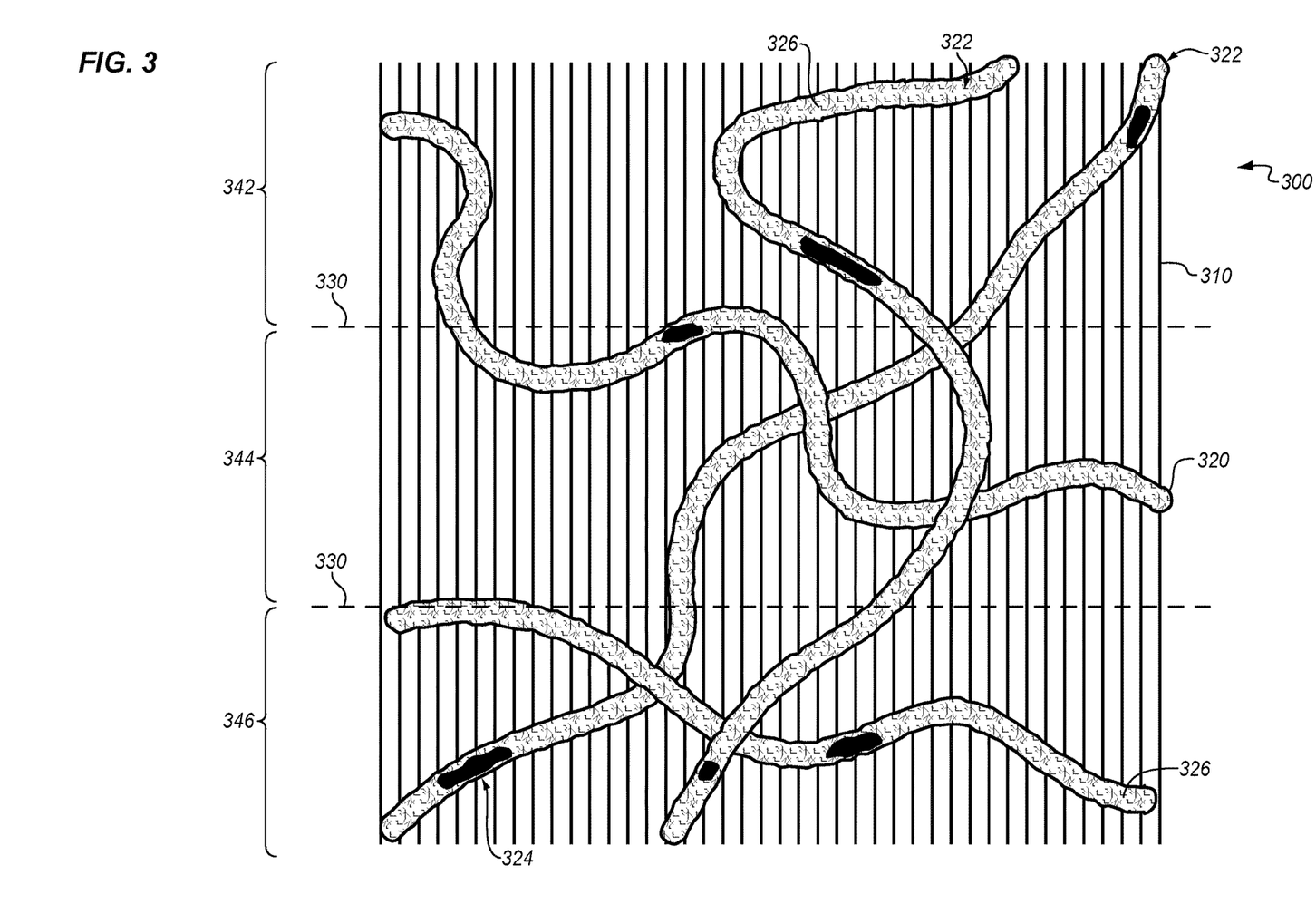
FIG. 3 is a diagram illustrating a picture of a fiber material in an illustrative embodiment.

FIG. 3 is a diagram illustrating a fiber material in an illustrative embodiment. Specifically, FIG. 3 is a top-down view of a single ply of unidirectional dry fiber material in the form of CFRP. FIG. 3 depicts one or more of strands 310 of carbon fiber, which are bound together via veil 320 of filaments 322. FIG. 3 depicts minor nonuniformity in distance between strands 310 of carbon fiber, because strands 310 at bundle 300 are expected to be roughly, but not perfectly, uniformly distributed. Some filaments have melted portions 324, while other filaments have unmelted portions 326. A single filament may have both melted regions and unmelted portions.

Figure 4:
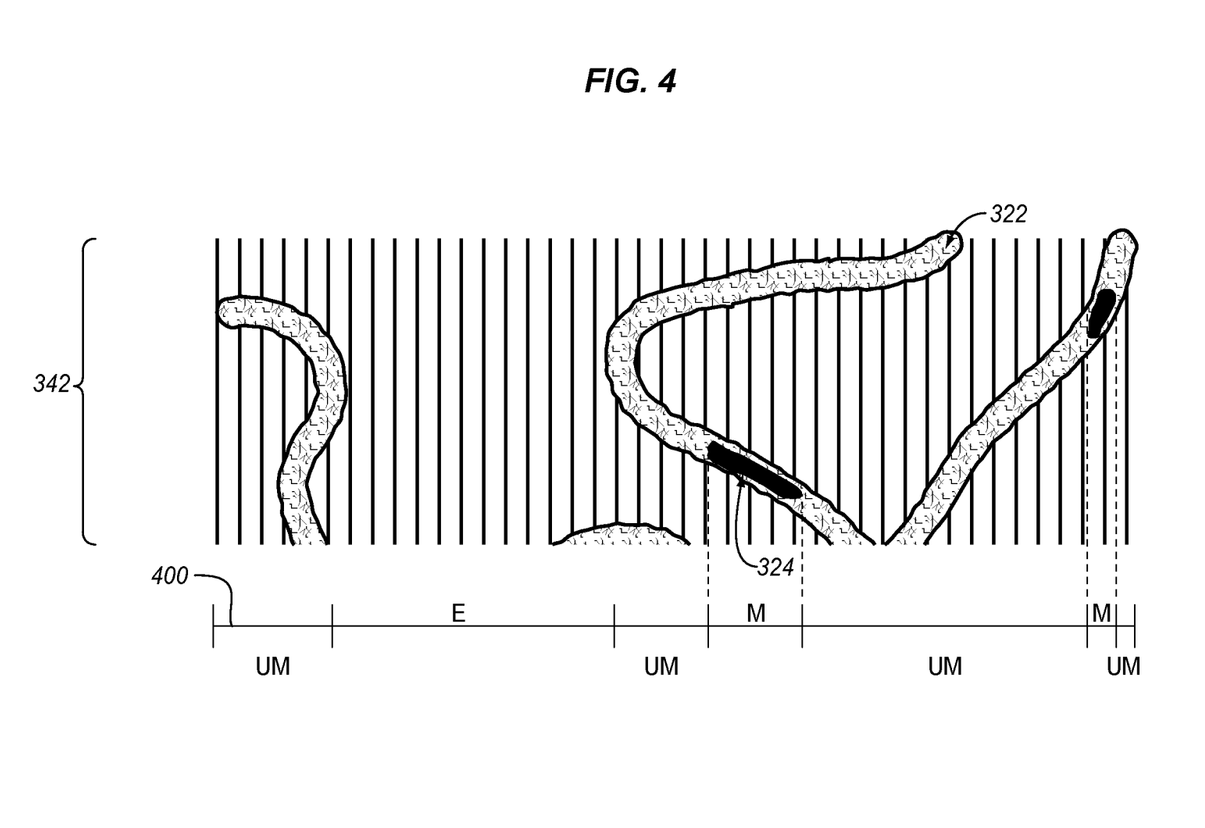
FIGS. 4-6 are diagrams illustrating slices from a picture in an illustrative embodiment.

In this example, picture 300 will be subdivided into slices at boundaries 330, resulting in slice 342, slice 344, and slice 346. FIG. 4 depicts the slice 342 in detail. As shown in FIG. 4 at bar 400, portions of slice 342 are labeled with different identifiers based on analysis by a neural network. "E" indicates a region which is empty of any kind of filament, "UM" indicates a region occupied by an unmelted filament, and "M" indicates a region occupied by a melted filament. The size (in this case, linear distance) of portions M may be compared to the size of regions UM in order to determine an amount of melted filament for slice 342.

Figure 5:
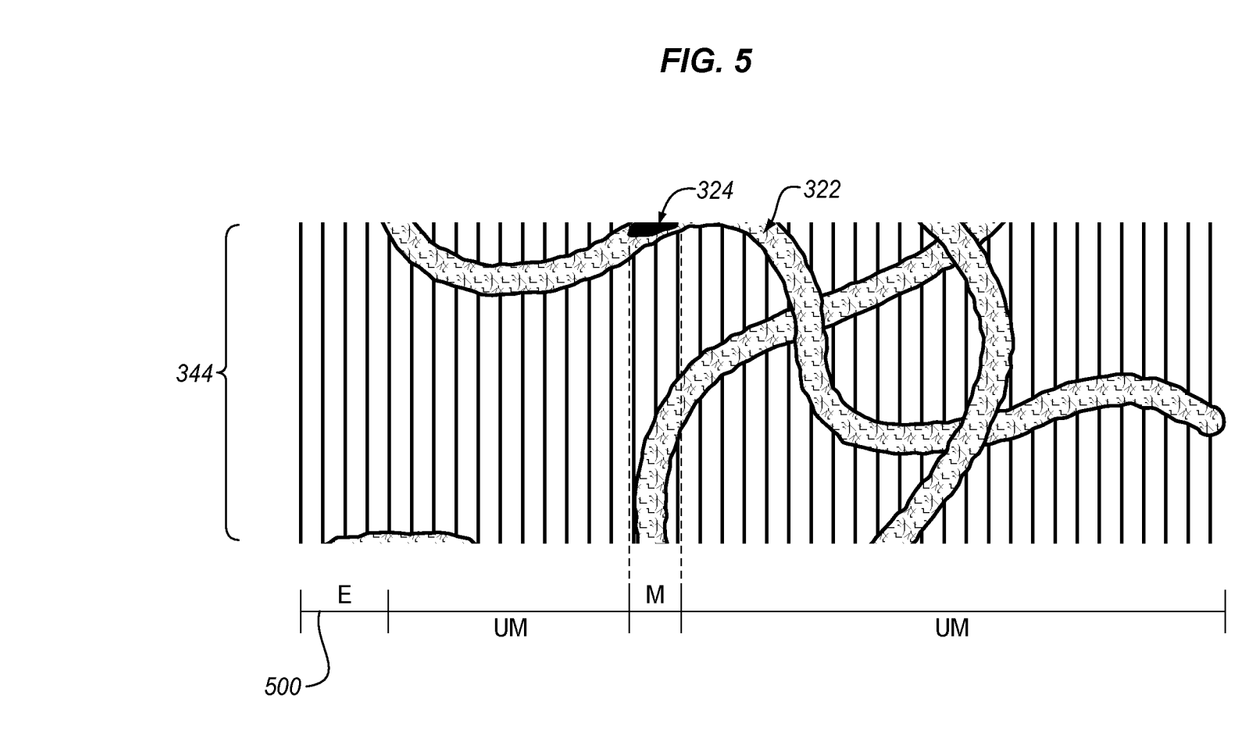
Figure 6:
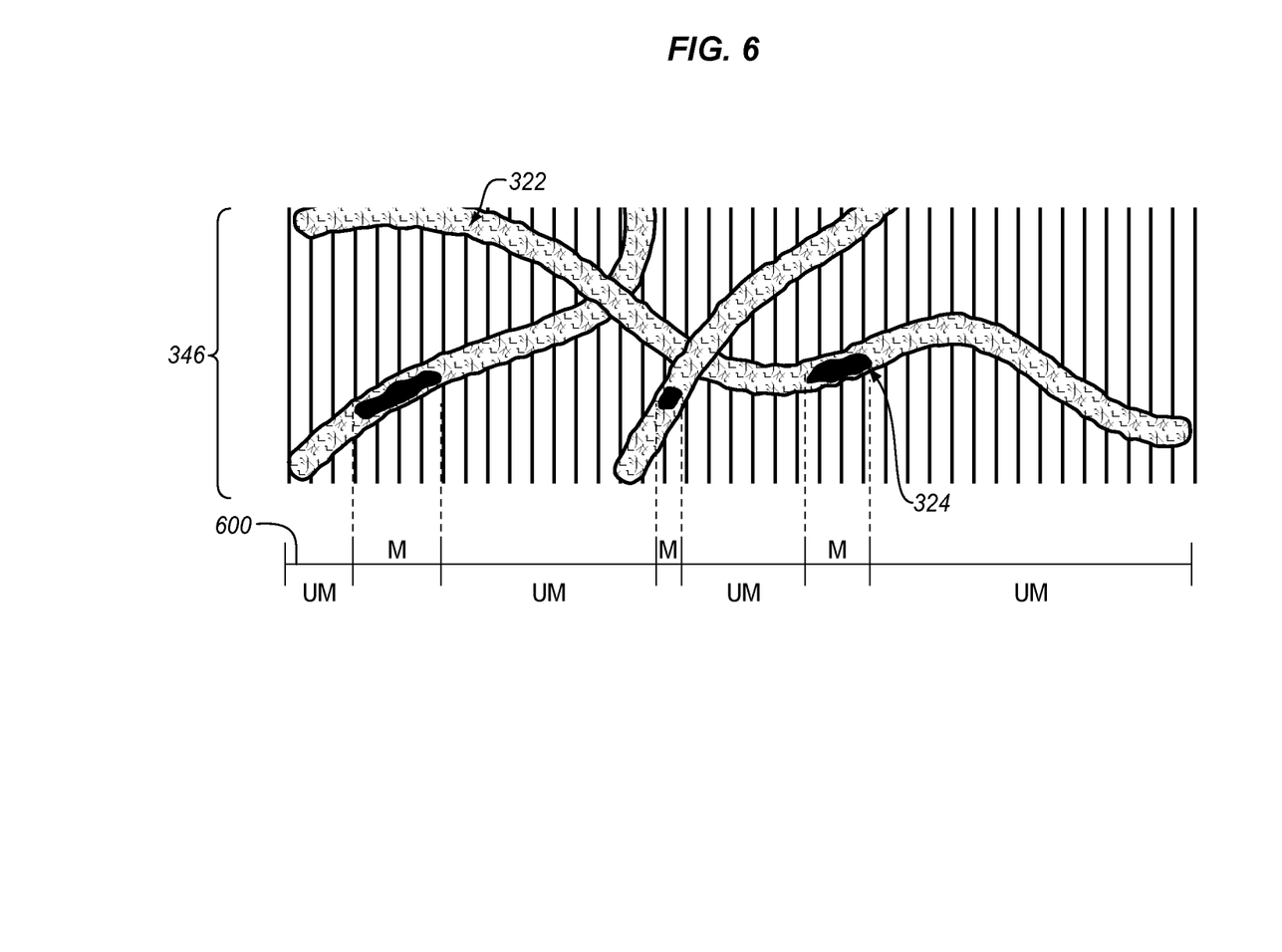

FIG. 5 depicts the slice 344, and depicts regions M, regions UM, and an empty region via a bar 500. In slice 344 the size of regions M is substantially smaller than the size of regions UM. FIG. 6 depicts the slice 346, which has the highest ratio of regions M to regions UM as indicated by bar 600.

Figure 7:
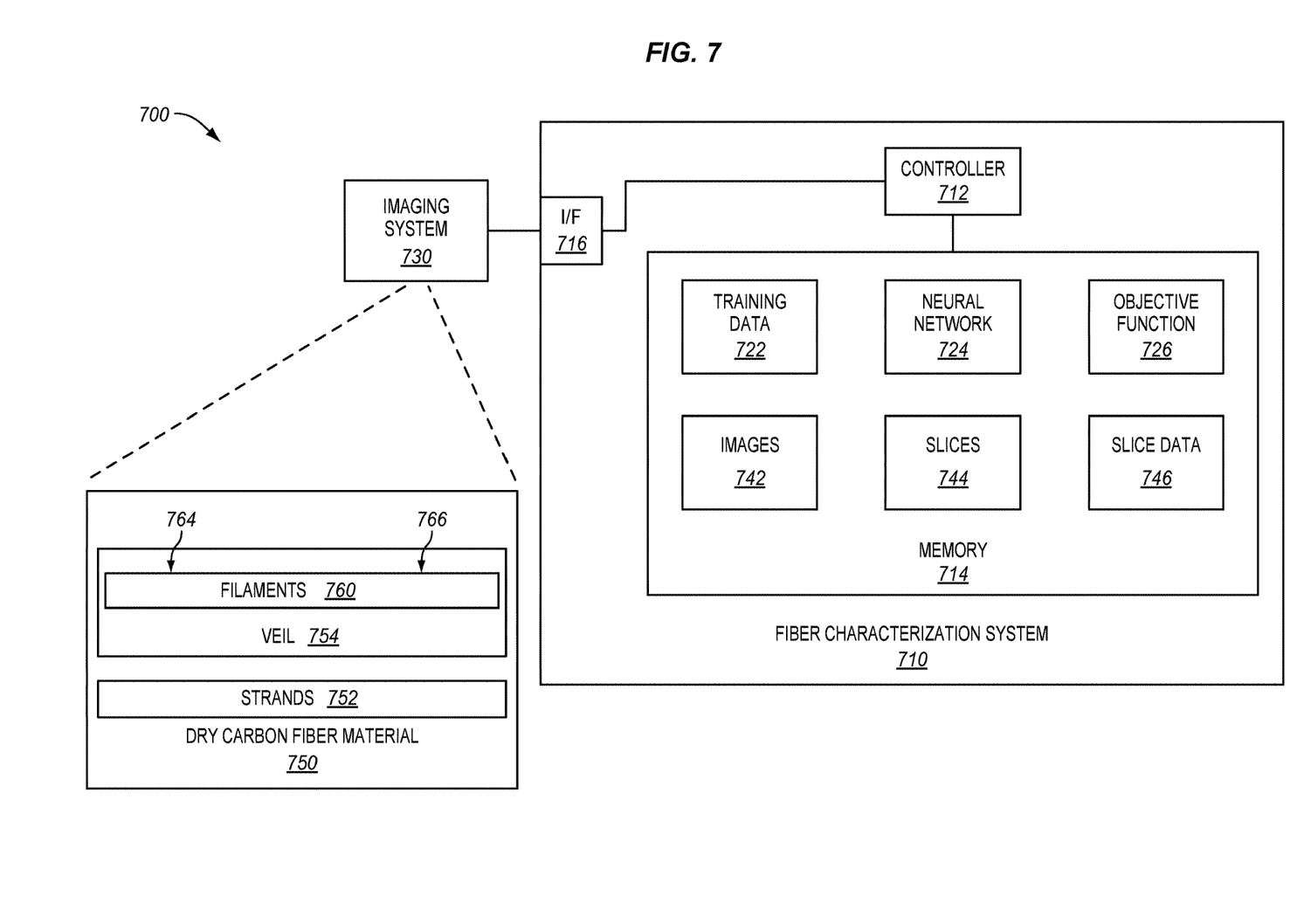
FIG. 7 is a block diagram of a fiber material evaluation system in an illustrative embodiment.

FIG. 7 is a block diagram of a fiber material evaluation system 700 in an illustrative embodiment. According to FIG. 7, the system includes carbon fiber material 750, which is made from strands 752 of carbon fiber, as well as veil 754 of filaments 760. Filaments 760 include melted portions 764 and unmelted portions 766. Imaging system 730 generates images of carbon fiber material 750, which are acquired (in digital form) by interface (I/F) 716. Controller 712 may direct these images to memory 714 for storage. Memory 714 stores neural network 724, as well as training data 722 and an objective function 726, which is used to score output from neural network 724 during training. Memory 714 also stores images 742, slices 744, and slice data 746. Slice data 746 may indicate, for example, the positions and amounts of melted and unmelted portions of filament detected in each slice. While the system as described above is focused upon dry fiber materials, in further embodiments it may be utilized to perform similar functions for pre-preg materials.

Figure 8:
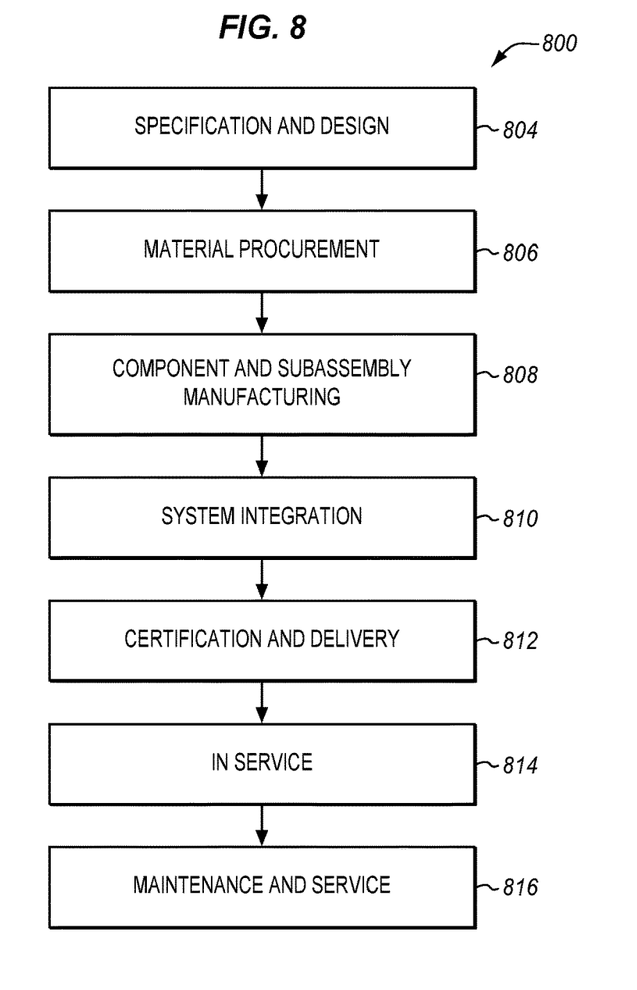
FIG. 8 is a flow diagram of aircraft production and service methodology in an illustrative embodiment.
Figure 9:
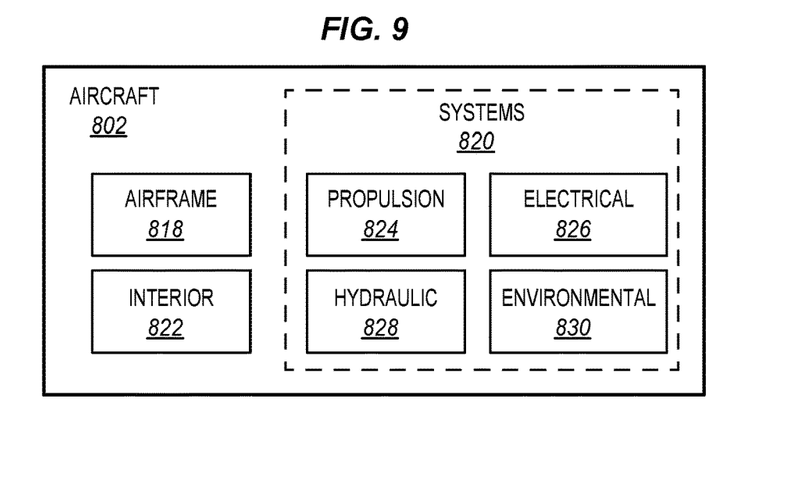
FIG. 9 is a block diagram of an aircraft in an illustrative embodiment.

Referring more particularly to the drawings, embodiments of the disclosure may be described in the context of aircraft manufacturing and service in method 800 as shown in FIG. 8 and an aircraft 802 as shown in FIG. 9. During pre-production, method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine work in maintenance and service 816 (which may also include modification, reconfiguration, refurbishment, and so on). Apparatus and methods embodied herein may be employed during any one or more suitable stages of the production and service described in method 800 (e.g., specification and design 804, material procurement 806, component and subassembly manufacturing 808, system integration 810, certification and delivery 812, service 814, maintenance and service 816) and/or any suitable component of aircraft 802 (e.g., airframe 818, systems 820, interior 822, propulsion system 824, electrical system 826, hydraulic system 828, environmental 830).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by method 800 may include an airframe 818 with a plurality of systems 820 and an interior 822. Examples of systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 800. For example, components or subassemblies corresponding to component and subassembly manufacturing 808 may be fabricated or manufactured in a manner similar to components or subassemblies produced while the aircraft 802 is in service. Also, one or more apparatus embodiments, method embodiments, or a combination thereof may be utilized during the subassembly manufacturing 808 and system integration 810, for example, by substantially expediting assembly of or reducing the cost of an aircraft 802. Similarly, one or more of apparatus embodiments, method embodiments, or a combination thereof may be utilized while the aircraft 802 is in service, for example and without limitation during the maintenance and service 816. For example, the techniques and systems described herein may be used for material procurement 806, component and subassembly manufacturing 808, system integration 810, service 814, and/or maintenance and service 816, and/or may be used for airframe 818 and/or interior 822. These techniques and systems may even be utilized for systems 820, including, for example, propulsion system 824, electrical system 826, hydraulic 828, and/or environmental system 830.

In one embodiment, a part comprises a portion of airframe 818, and is manufactured during component and subassembly manufacturing 808. The part may then be assembled into an aircraft in system integration 810, and then be utilized in service 814 until wear renders the part unusable. Then, in maintenance and service 816, the part may be discarded and replaced with a newly manufactured part. Inventive components and methods may be utilized throughout component and subassembly manufacturing 808 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for characterizing a ply of fiber having a thermoplastic veil, the method comprising:
   acquiring an image of a surface of the ply, the ply comprising unidirectional strands of fiber and further comprising a veil disposed atop the unidirectional strands of fiber, the veil comprising melted filaments of thermoplastic and unmelted filaments of thermoplastic that are depicted in the image;
   subdividing the image into slices that depict the melted filaments and the unmelted filaments;
   classifying regions that are linear within each of the slices into classifications selected from the group consisting of: melted filament, unmelted filament, and empty of filament;
   determining an amount of the melted filaments depicted within each of the slices based on the classifications; and determining an amount of the unmelted filaments depicted within each of the slices based on the classifications.

2. The method of claim 1 further comprising:
quantifying an amount of melting of the veil for each slice, based on the number of melted filaments and the number of unmelted filaments for that slice; and
quantifying an amount of melting of the veil for the image, based on the amount of melting of the veil for each slice.

3. The method of claim 1 wherein:
determining the amount of melted filaments comprises identifying linear portions of each slice that are classified as-melted filament; and
determining the amount of unmelted filaments comprises identifying linear portions of each slice that are classified as unmelted filament.

4. The method of claim 1 wherein:
the determining steps are performed via a neural network that has been trained.

5. The method of claim 4 wherein:
the neural network comprises a convolutional neural network.

6. The method of claim 1 further comprising:
comparing an amount of melting of the veil for the image to design tolerances; and
transmitting a notification in response to determining that the amount of melting of the veil for the image is not within the design tolerances.

7. The method of claim 1 further comprising:
distinguishing melted filaments from unmelted filaments based upon differences in at least one of brightness or color.

8. The method of claim 1 wherein:
the strands of fiber are selected from the group consisting of carbon fiber, glass fiber, metallic fiber, and ceramic fiber.

9. The method of claim 8 wherein:
the strands of fiber are strands of carbon fiber.

10. A portion of an aircraft assembled according to the method of claim 1.

11. A non-transitory computer readable medium embodying programmed instructions which, when executed by a processor, are operable for performing a method for characterizing a ply of fiber having a thermoplastic veil, the method comprising:
acquiring an image of a surface of a ply, the ply comprising unidirectional strands of fiber and further comprising a veil disposed atop the unidirectional strands of fiber, the veil comprising melted filaments of thermoplastic and unmelted filaments of thermoplastic that are depicted in the image;
subdividing the image into slices that depict the melted filaments and the unmelted filaments;
classifying regions within each of the slices into classifications selected from the group consisting of: melted filament, unmelted filament, and empty of filament;
determining an amount of the melted filaments depicted within each of the slices based on the classifications; and
determining an amount of the unmelted filaments depicted within each of the slices based on the classifications.

12. A portion of an aircraft assembled according to the method defined by the instructions stored on the computer readable medium of claim 11.

13. An apparatus for characterizing a ply of fiber having a thermoplastic veil, the apparatus comprising:
an interface that receives an image of a surface of a ply, the ply comprising unidirectional strands of fiber and further comprising a veil disposed atop the unidirectional strands of fiber, the veil comprising melted filaments of thermoplastic and unmelted filaments of thermoplastic that are depicted in the image; and
a controller that subdivides the image into slices, classifies regions that are linear within each of the slices into classifications selected from the group consisting of: melted filament, unmelted filament, and empty of filament, determines an amount of the melted filaments depicted within each of the slices based on the classifications, and determines an amount of the unmelted filaments depicted within each of the slices based on the classifications.

14. The apparatus of claim 13 wherein:
the controller quantifies an amount of melting of the veil for each slice based on the number of melted filaments and the number of unmelted filaments for that slice, and quantifies an amount of melting of the veil for the image, based on the amount of melting of the veil for each slice.

15. The apparatus of claim 13 wherein:
the controller operates a neural network that determines the amount of melted filaments by identifying linear portions of each slice that are classified as melted filament; and
the controller determines the amount of unmelted filaments by identifying linear portions of each slice that are classified as unmelted filament.

16. The apparatus of claim 13 wherein:
the controller determines the amount of melted filaments and the amount of unmelted filaments via a neural network that has been trained.

17. The apparatus of claim 16 wherein:
the neural network comprises a convolutional neural network.

18. The apparatus of claim 13 further comprising:
comparing an amount of melting of the veil for the image to design tolerances; and
transmitting a notification in response to determining that the amount of melting of the veil for the image is not within the design tolerances.

19. The apparatus of claim 13 wherein:
the strands of fiber are selected from the group consisting of carbon fiber, glass fiber, metallic fiber, and ceramic fiber.

20. Fabricating a portion of an aircraft using the apparatus of claim 13.

* * * * *